(12) United States Patent
Dharnipragada

(10) Patent No.: US 6,490,493 B1
(45) Date of Patent: Dec. 3, 2002

(54) INDUSTRIAL PROCESS DEVICE MANAGEMENT SOFTWARE

(75) Inventor: Sudhakar Dharnipragada, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/235,079

(22) Filed: Jan. 21, 1999

(51) Int. Cl.⁷ .............................................. G06F 19/00
(52) U.S. Cl. ......................... 700/97; 700/105; 700/108
(58) Field of Search ........................ 700/97, 105, 108

(56) References Cited

U.S. PATENT DOCUMENTS

| | | | |
|---|---|---|---|
| 4,047,003 A | 9/1977 | LaRocca et al. | 700/9 |
| 4,096,566 A | 6/1978 | Borie et al. | 710/126 |
| 4,517,637 A | 5/1985 | Cassell | 700/9 |
| 4,598,381 A | 7/1986 | Cucci | 702/138 |
| 4,602,343 A | 7/1986 | Dougherty | 700/278 |
| 4,628,437 A | 12/1986 | Poschmann et al. | 700/2 |
| 4,648,064 A | 3/1987 | Morley | 710/45 |
| 4,663,704 A | 5/1987 | Jones et al. | 700/83 |
| 4,672,529 A | 6/1987 | Kupersmit | 700/1 |
| 4,680,753 A | 7/1987 | Fulton et al. | 370/449 |
| 4,774,656 A | 9/1988 | Quatse et al. | 714/4 |
| 4,777,584 A | 10/1988 | Pogue | 700/17 |
| 4,796,194 A | 1/1989 | Atherton | 700/103 |
| 4,864,489 A | 9/1989 | Yasuhara et al. | 700/2 |
| 4,910,658 A | 3/1990 | Dudash et al. | 700/9 |
| 4,910,691 A | 3/1990 | Skeirik | 706/45 |
| 4,918,690 A | 4/1990 | Markkula, Jr. et al. | 370/400 |
| 4,965,742 A | 10/1990 | Skeirik | 700/86 |
| 4,965,880 A | 10/1990 | Petitjean | 700/112 |
| 5,068,778 A | 11/1991 | Kosem et al. | 388/9 |
| 5,095,417 A | 3/1992 | Hagiwara et al. | 700/9 |
| 5,095,755 A | 3/1992 | Peterson | 73/706 |
| 5,122,948 A | 6/1992 | Zapolin | 700/2 |
| 5,134,574 A | 7/1992 | Beaverstock et al. | 702/84 |
| 5,146,401 A | 9/1992 | Bansal et al. | 700/9 |
| 5,168,441 A | 12/1992 | Onarheim et al. | 700/17 |
| 5,179,701 A | 1/1993 | Chisholm | 707/104 |
| 5,247,450 A | 9/1993 | Clark | 700/158 |
| 5,265,005 A | 11/1993 | Schmidt et al. | 700/18 |
| 5,289,365 A | 2/1994 | Caldwell et al. | 700/9 |
| 5,307,346 A | 4/1994 | Fieldhouse | 370/254 |
| 5,307,491 A | 4/1994 | Feriozi et al. | 709/326 |

(List continued on next page.)

FOREIGN PATENT DOCUMENTS

| | | | | |
|---|---|---|---|---|
| DE | 42 10 376 A1 | 10/1992 | | |
| EP | 0 434 288 A2 | 6/1991 | | |
| EP | 0 434 986 A2 | 7/1991 | | |
| EP | 0 560 226 A2 | 9/1993 | | |
| EP | 0 643 344 A1 | 7/1994 | ......... | G05B/19/418 |
| EP | 0 660 210 A2 | 12/1994 | ......... | G05B/19/418 |

(List continued on next page.)

OTHER PUBLICATIONS

Product Data Sheets PDS 4016, entitled, "Filled Systems for Pressure Transmitters", by Rosemount Inc., Eden Prairie, MN (Feb. 1994).

(List continued on next page.)

*Primary Examiner*—Thomas Black
*Assistant Examiner*—Ronald D Hartman, Jr.
(74) *Attorney, Agent, or Firm*—Westman, Champlin & Kelly

(57) ABSTRACT

An apparatus, method, and medium readable by a computer processor for specifying and managing process devices such as measurement instruments and valves are provided. Sequences of instructions are used to: receive process requirements, select and specify a process device meeting process requirements, order the specified process device, evaluate the ordered process device creating a built process device database, and manage the built process device using the built process device database to make decisions regarding the built process device.

17 Claims, 5 Drawing Sheets

U.S. PATENT DOCUMENTS

| | | | |
|---|---|---|---|
| 5,311,451 A | 5/1994 | Barrett | 708/278 |
| 5,319,541 A | 6/1994 | Blanchard et al. | 705/29 |
| 5,319,751 A | 6/1994 | Garney | 711/115 |
| 5,333,114 A | 7/1994 | Warrior et al. | 700/67 |
| 5,365,423 A | 11/1994 | Chand | 700/12 |
| 5,412,643 A | 5/1995 | Kogure | 370/225 |
| 5,432,711 A | 7/1995 | Jackson et al. | 340/825.03 |
| 5,442,639 A | 8/1995 | Crowder et al. | 714/712 |
| 5,444,851 A | 8/1995 | Woest | 709/222 |
| 5,459,867 A | 10/1995 | Adams et al. | 709/321 |
| 5,465,364 A | 11/1995 | Lathrop et al. | 709/321 |
| 5,475,856 A | 12/1995 | Kogge | 712/20 |
| 5,481,741 A | 1/1996 | McKaskle et al. | 345/522 |
| 5,485,400 A | 1/1996 | Warrior et al. | 700/67 |
| 5,485,620 A | 1/1996 | Sadre et al. | 717/10 |
| 5,486,998 A | 1/1996 | Corso | 364/152 |
| 5,493,534 A | 2/1996 | Mok | 365/226 |
| 5,497,316 A | 3/1996 | Sierk et al. | 700/11 |
| 5,513,095 A | 4/1996 | Pajonk | 700/2 |
| 5,529,490 A | 6/1996 | Klein et al. | 433/3 |
| 5,530,643 A | 6/1996 | Hodorowski | 700/86 |
| 5,549,137 A | 8/1996 | Lenz et al. | 137/486 |
| 5,550,746 A | 8/1996 | Jacobs | 700/231 |
| 5,550,980 A | 8/1996 | Pascucci et al. | 359/111 |
| 5,566,320 A | 10/1996 | Hubert | 711/147 |
| 5,576,946 A | 11/1996 | Bender et al. | 700/17 |
| 5,586,324 A | 12/1996 | Sato et al. | 713/2 |
| 5,597,995 A | 1/1997 | Williams et al. | 73/504.16 |
| 5,598,344 A | 1/1997 | Dangelo et al. | 716/18 |
| 5,613,123 A | 3/1997 | Tsang et al. | 713/1 |
| 5,623,592 A | 4/1997 | Carlson et al. | 345/348 |
| 5,933,350 A * | 8/1999 | Fujimoto et al. | 700/121 |

FOREIGN PATENT DOCUMENTS

| | | |
|---|---|---|
| FR | 2 692 701 | 12/1993 |
| FR | 2 713 360 | 6/1995 |
| WO | WO 95/04314 | 2/1995 |
| WO | Wo 95/09387 | 4/1995 |
| WO | WO 95/26527 | 10/1995 |
| WO | WO 96/07957 | 3/1996 |

OTHER PUBLICATIONS

Product Data Sheet PDS 4672, entitled, "Differential and Gage Pressure Transmistters With Remote Seals", by Rosemount Inc., Eden Prairie, MN (Mar. 1992).

PDS 4017A00, entitled, "Model 1199 SOAP Seal Ordering Application Program", by Rosemount Inc., Eden Prairie, MN (Nov. 1994).

Product Data Sheet PDS 4693, entitled "Model 2500H1 Cornerstone™ Base Station," by Rosemount Inc., Eden Prairie, MN (Apr. 1995).

"Electronic Catalogs: A Technology Overview and Survey Results", by A. Segev et al., (1995), pp. 11–18.

"Electronic Tool Selection", *Manufacturing Engineering*, (Jan. 1996), pp. 57–59.

"Implementation Requirements for Electronic Standard Component Catalogues", by S.J. Culley et al., *Proceedings of the Institutioin of Mechanical Engineers, Part B Journal of Engineering Manufacture*, vol. 205, No. B4, (1991), pp. 253–260.

"EC–Enabled Procurement: The Missing Links", by Gartner–Group, (Mar. 13, 1996).

"Improved Design and Mounting of Remote Seal Liquid Level Transmitters", by H.R. Jaquith, *ISA*, Paper #92–0392, (1992).

"Object–Oriented Design Environments in Process Control", by Dr. J. Arnold et al., *Advances in Instrumentation and Control*, Part 3, pp. 1237–1245 (1989).

*Product Data Sheet PDS 4693*, "Model 2500H1—Cornerstone Base Station", by Fisher–Rosemount Systems, Inc., (Sep. 1995).

*Bulletin 62.1:VL2000*, "FIELDVUE® ValveLink Series VL200 Software", by Fisher Controls International, Inc., (Nov. 1995).

*Product Data Sheet PS—00033*, "ProLink® Software— PC–Based Communications Program", by Micro Motion, Inc., (Nov. 1995).

"Fieldvue Instruments—Opening a Window To The Process", by Fisher Controls International, Inc., (1994).

*Bulletin 62.1:DVC5000*, "FIELDVUE™ Digital Valve Controller Type DVC5000 Series", by Fisher Controls International, Inc., (Jun. 1994).

*Bulletin 62.1:DVC5000 (S1)*, "FIELDVUE™ Digital Valve Controller DVC5000 Series Remotely Accessible Information", by Fisher Controls International, Inc., (Jun. 1994).

*Bulletin 62.1:DT4000 (S1)*, "FIELDVUE™ Digital Transducer DT4000 Remotely Accessible Information", by Fisher Controls International, Inc., (Jun. 1994).

*Bulletin 62.1 :VL1000*, "Type VL1000 FIELDVUE™ Valve Link", by Fisher Controls International, Inc., (Jun. 1994).

*Bulletin 62.1 :DT4000*, "FIELDVUE™ Digital Transducer Type DT4000", by Fisher Controls International, Inc., (Jun. 1994).

*Type HF100*, "Type HF100 FIELDVUE™ Hart® Filter", by Fisher Controls International, Inc., (Dec. 1993).

*Instruction Manual Form 5345*, "HART® Communicator Manual", by Fisher–Rosemount Systems, Inc., (Apr. 1995).

*Instruction Manual Form 5335*, "Type DVC5000 Series", by Fisher–Rosemount Systems, Inc., (Jun. 1995).

*Instruction Manual Form 5334*, "Type DT4000", by Fisher–Rosemount Systems, Inc., (Jun. 1995).

"InterOperable Systems™ Project (ISP) Device Description Services (DDS) User's Guide", *Document ISP–94–110*, (Jun. 24, 1994).

"InterOperable Systems™ Project Fieldbus Specification Device Description Language", *Document 92–60–06*, (Dec. 1, 1993).

"Instrument Remotely Verifies Valve's Stem Position", *Chemical Processing*, (Dec. 1993).

Designing and Implementing a Plantwide Information and Control System, by J. Janovski, *ISA*, Paper No. 92–0455, pp. 297–311, (1992).

Advant Cement System—Closing the Gap Between Process and Business Control, by Dr. Krings, *ABB Review*, pp. 22–31, (1995).

* cited by examiner

INDUSTRIAL PROCESS DEVICE MANAGEMENT SOFTWARE

BACKGROUND OF THE INVENTION

The invention relates generally to industrial process control systems and more specifically to software used to assist industrial process engineers with specifying and managing process devices.

Industrial processes often involve a material such as a fluid moving through pipes and tanks to transform less valuable materials into more valuable and useful products such as petroleum, chemicals, paper, and food. For example an oil refinery can process crude oil into gasoline, fuel oil, and other petrochemicals. Industrial process control systems use process devices such as measurement instruments known as transmitters for sensing and measuring process parameters such as pressure, flow, temperature, and level along with control devices such as valves, pumps and motors to control the flow of process materials.

When process plants are designed, process requirements are identified for specific points in the process plant, known as Tags, for process devices to measure or control the process. Usually an engineer will evaluate process requirements in order to specify a particular process device. Design engineers specifying process devices for a process plant evaluate process requirements using a variety of computer programs including 3-D modeling and process studies by simulating PID control functions, calculators, and process device manufacturer catalogs to make technology decisions and specify complex specific process devices. Complex process devices have billions of manufacturing combinations that result from the many technology decisions made by design engineers or mandated by the manufacturer, for example, a Rosemount® model 3051 with remote seals has over four billion potential manufacturing combinations. Once the process device is specified, the process device must be ordered which is usually yet another task for a design or procurement engineer. This procedure often involves reentry of the data by the design engineer and is time consuming, expensive, and error prone.

When the specified process device arrives at the process plant it is not uncommon that the built process device is slightly different from the ordered process device due to the large number of potential manufacturing combinations or to the fact that process data has changed. The differences between the ordered process device and the built process device are evaluated by inspecting the built process device and comparing it against the specification of the ordered process device. A manual comparison is often time consuming, expensive and error prone.

In the event a process device fails and requires replacement, a process plant engineer will likely need to order an identical replacement process device. To ensure the replacement process device is identical, the process plant engineer will likely need to locate the specification sheet for the process device, determine if differences in the built process device should be incorporated into the replacement process device, and then send the specification information to the process device manufacturer. This reorder procedure for a replacement process device is time consuming, expensive, and error prone. Further, in the event that the process data has changed, the engineer will need to reevaluate the instrument specification.

For the foregoing reasons, there is a need for software that simplifies the design engineer's specification and ordering process. There is also a need for software to automate the comparison between ordered process devices and built process devices to simplify process plant decisions concerning built process devices. Finally, there is a need for software that simplifies reordering a process device when a replacement process device is required.

SUMMARY OF THE INVENTION

The invention is directed to an apparatus, method, and medium readable by a computer processor that satisfies the need for software to simplify specification of process devices and management of built process devices. Aspects of software having features of the invention include the following sequences of instructions: device requirement instructions that receive process requirements to define the operating requirements for a process device; device performance instructions that provide performance of the device of the stated condition, device selection instructions that evaluate the process requirements against predetermined process device data and define a specified process device meeting the process requirements; device order instructions that place the specified process device into an ordered database that can be sent to a process device manufacturer to initiate building of the specified process device; device evaluation instructions that evaluate a built process device to obtain built process device data representing the built process device's performance characteristics; and device management instructions that use the built process device data to create a built database to make decisions regarding the built process device.

In one embodiment of the invention, device comparison instructions compare the ordered database with the built database stored in memory to create a discrepancy database that is used to determine whether the built process device meets process requirements.

In another embodiment of the invention, device maintenance instructions receive a request for a replacement built process device, recall the built process device data from the built database and order a replacement built process device from the process device manufacturer.

DETAILED DESCRIPTION OF THE PREFERRED EMBODIMENTS

Figure 1:
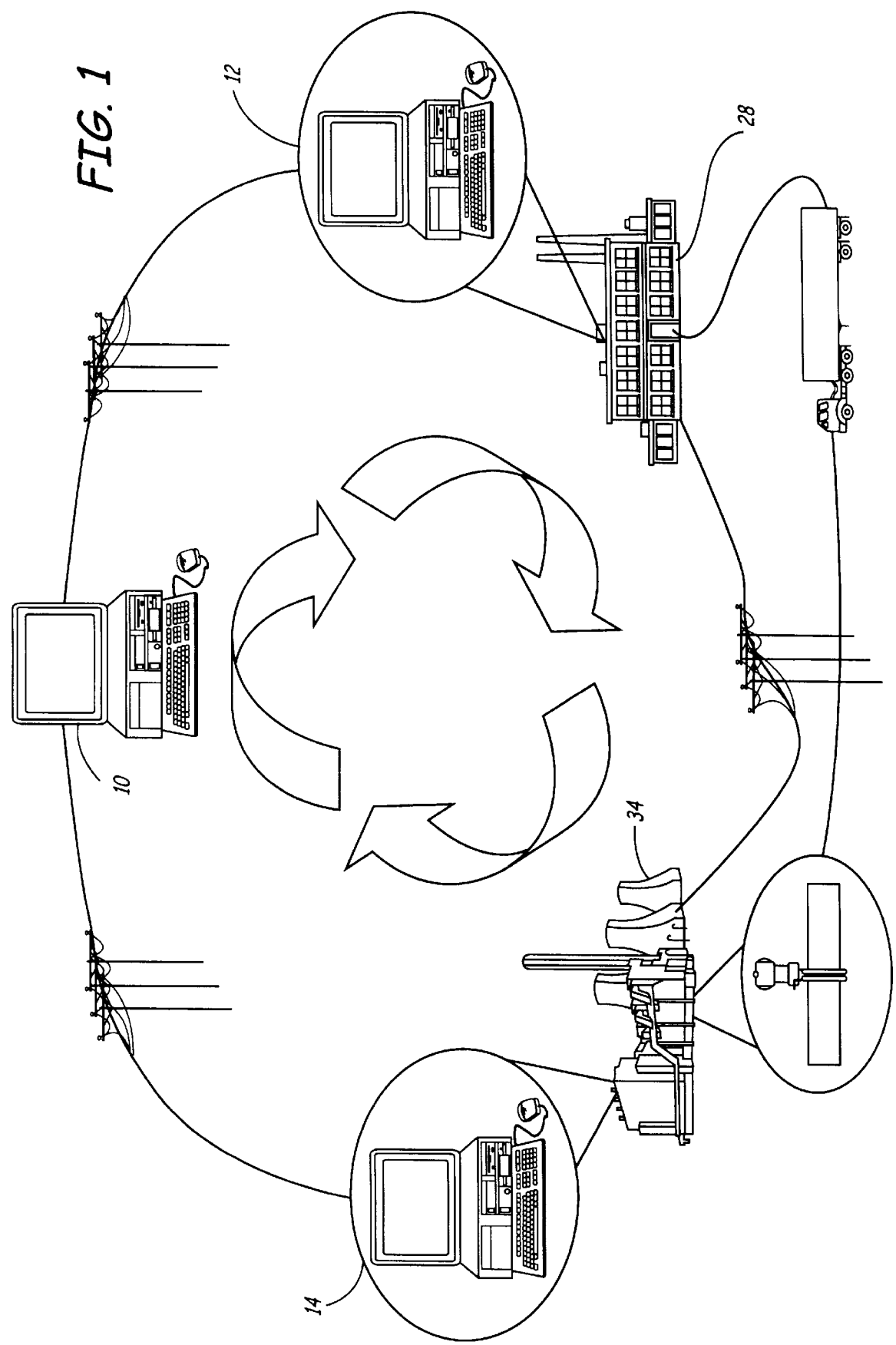
FIG. 1 is a diagrammatic view of the environment of embodiments of the industrial process device management software in accordance with the invention.

FIG. 1 shows the environment of embodiments of the invention. The software integrates process device requirement entry, selection, specification and ordering often done on a design computer with built process device evaluation often done on a manufacturing plant computer, and built process device management often done on a process plant computer. The integration of the process device information during the life-cycle of process device substantially eliminates the need to reenter information which significantly reduces the time, cost and potential errors involved during each of the steps of the process device life-cycle. The invention uses the tan number for each one of these databases. Further, device revision control is also incorporated. Although a separate design computer 10, manufacturing plant computer 12 and process plant computer 14 are shown, the function of these computers could be performed by a single computer, or any appropriate number of computers.

The design computer 10, manufacturing plant computer 12, and process plant computer 14 each have a processor, memory, at least one input device, and at least one output device. The input devices can be devices such as a keyboard, pointing device, a barcode reader, a modem, or a disc drive. The output devices can be devices such as a modem, disc drive, a monitor, or a printer. The design computer 10 can be a personal computer that uses an operating system such as Microsoft® Windows™ 98 or Windows NT configured as a stand-alone or a client server. The manufacturing plant computer 12 can also be a personal computer or a larger computer such as a server or mainframe operating a business order management system such as Oracle® or SAP or PEOPLESOFT. The process plant computer 14 can also be a personal computer operating process device asset management software such as an Asset Management Solutions (AMS) Field Manager available from Fisher-Rosemount Inc. or Cornerstone™ available from Applied System Technologies, Inc. The modems of both the manufacturing plant computer and process plant computer should be capable of communicating in a variety of industrial process device protocols such as Highway Addressable Remote Transducer (HART®) and Foundation Fieldbus™. The industrial process device management software can be configured to integrate with industrial process device asset management software. Data can be communicated between the computers using modems, local area networks, or wide area networks, or Internet using any appropriate software technologies such as Dynamic Data Exchange (DDE), Object Linking and Embedding (OLE), and Open Database Connectivity (ODBC). The data can also be communicated through a physical delivery of computer readable media such as a diskette.

The software uses a database engine such as Sybase SQL Anywhere and a programming development language such as Microsoft Visual C++. The software may also use other programs such a hyper-text program and a reports generation program. The software architecture is built on Microsoft Foundation Classes (MFC) that include: Graphic User Interface (GUI) Classes, Open DataBase Connectivity Classes (ODBC), MFC Extension Classes, and Calculation Classes. The relational database architecture accommodates a process device configuration module which has the capability to store predetermined process data. The process device configuration module has a core set of tables that captures process device selection schematics and specification data. The process device configuration module also has exception rules that identify selection and specification issues for one or more process devices and allow the programming language to apply expert rules that model process requirements against one or more process devices. The process device configuration module can accommodate up to 5,000 process devices per project and as many projects as can be stored in the available memory.

Visual C++ can be used to build the user interface and employ MFC database classes and the Open Database Connectivity (ODBC) standard to communicate with the database server. The user-interface is designed for ease of operator use by implementing a standard such as Microsoft Windows Interface Guidelines for Software Design ISBN 1-55615-679. Both the Visual C++ classes and the database server design facilitate use of other databases servers that are available such as Oracle and Microsoft SQL Server. The software connects to the database when the application is opened by a user.

Process device modules fully integrated with a common interface are used by the software for broad types of process devices such as measurement using pressure, flow, temperature, and level, and process control using valves, motors, and switching. The organization of the software into modules permits the software to be customized for the user with any or all available modules. The software contains import and export features that allow users to electronically import process data, perform sizing and selection, and then export the process device specifications to existing databases. The import feature is based on a user-defined Comma Separated Value (CSV) file. The import operation is designed so that it can understand any CSV file that is record oriented and that has a device process requirements specified on a single line. The knowledge about a specific CSV file is stored in an import header file. The import header file specifies how the records and fields in the CSV file are mapped to the database schema. Once the imported process devices are sized and selected the user can export the specification data to a CSV file. This CSV file can then be merged into existing databases according to the user's requirements.

Figure 2:
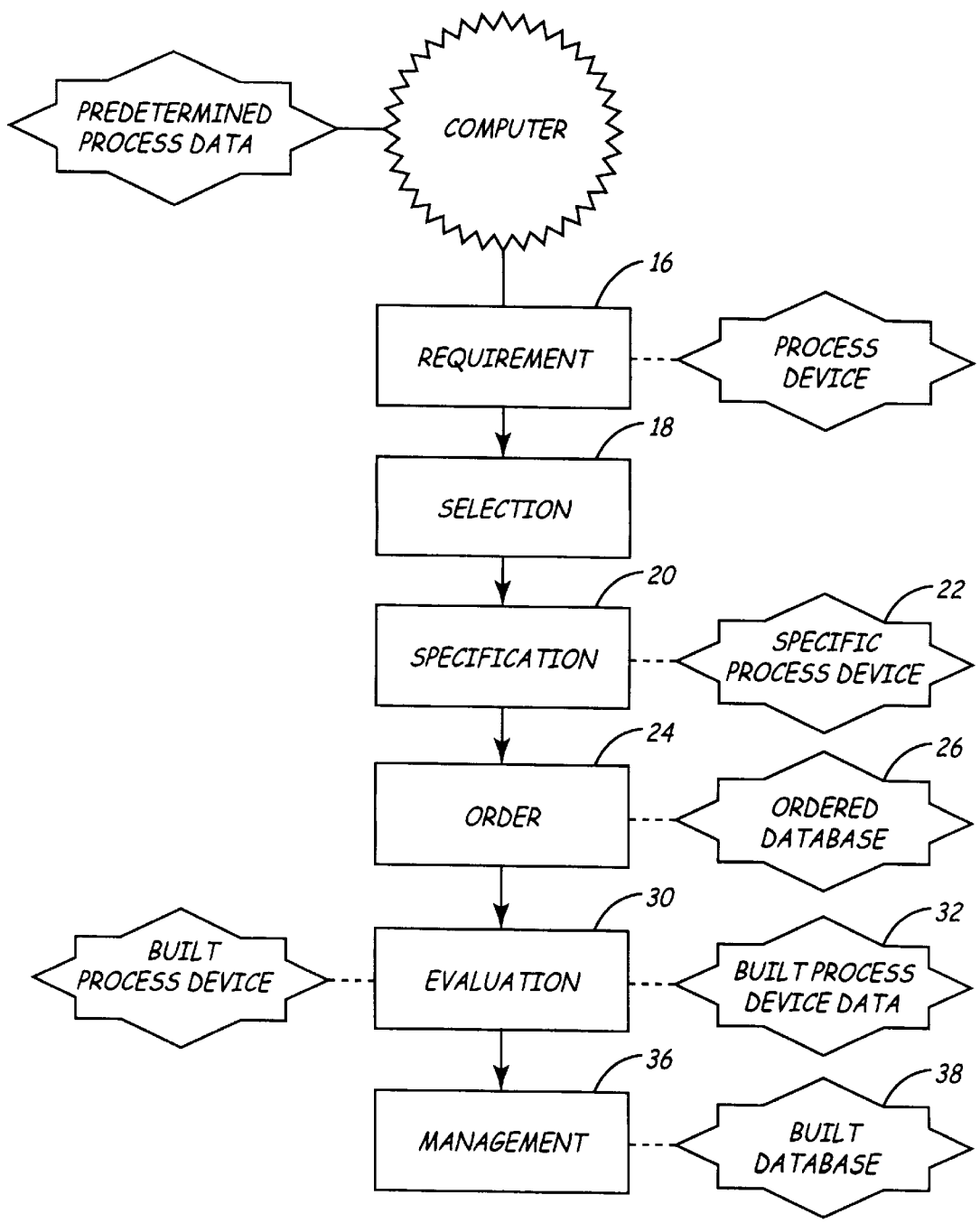
FIG. 2 is a flowchart of an embodiment of the industrial process device management software in accordance with the invention.

The flowchart in FIG. 2 is now referenced to discuss the following sequences of instructions: device requirement, device ordered, device evaluation, and device management.

Requirement Instructions. The device requirement sequence of instructions 16 receives process requirements though a computer input to define the operating requirements for a process device. The device requirement sequence of instructions 16 functions as a means to receive process requirements in a form that can be used by the software.

The process requirements are entered into the design computer input and received by the software. The process requirements are often taken from process data sheets and piping and instrument diagrams. The process requirements can be entered into the design computer 10 input manually often by a design engineer through a keyboard, or the process requirements can be imported electronically to save time and reduce the opportunity for data entry errors. The process requirements for a point in the process plant are organized under a unique identifier known as a Tag which represents a specific process device. For example Tag information for a differential pressure flow transmitter can include: Tag number, process fluid parameters, flow rates, pressure conditions, temperature conditions, pipe size, connection type, and materials of construction.

The user interface used during the device requirement sequence of instructions 16 is organized for ease of use by application type, e.g., pressure, flow and temperature, and by devices available within each application type. Once the Tags are brought into the software, the software automatically organizes the Tags into a logical sequence. When a Tag is imported into the software, the status of the Tag is shown as imported allowing the user to quickly size and select the process device.

Selection Instructions. The device selection sequence of instructions 18 evaluates the process requirements against predetermined process device data and defines a specified process device meeting process requirements. The device selection sequence of instruction 18 functions as a means for specifying a process device that meets process requirements by assisting the software user in selecting a technology that meets the process device requirements and then applying the selected technology to process requirements to define a specified process device.

The device selection sequence of instruction 18 evaluates the process requirements against predetermined process device data with a technology algorithm that will identify the technologies that the software user can consider. In selecting a technology, the software user can consider such factors as cost, installation requirements, and foreseeable process plant modifications. During the evaluation of process requirements against predetermined process device data, the software will execute numerous validation checks to ensure the process devices selected are compatible with the process requirements. For example, the software will carry out a variety of pressure and temperature limit checks against user entered values to ensure suitability of the process device for the application.

Once the process device technology is selected and technology decisions have been made, the software will apply the process requirements to these decisions using sizing algorithms that allow the software user to evaluate specific performance characteristics of the selected technology. During this evaluation, the software user can reconsider and change technology decisions as desired. When the technology decisions are finalized, the software can then specify a process device configuration for a particular model number that will meet the process requirements with a specification sequence of instructions 20. The specified process device is defined with a specification sheet 22 created by the specification sequence of instructions 20 for each process device that contains such information as process requirements, performance characteristics, and model number. The specification 22 can take many forms including an Instrument Society of America (ISA) SA-SP20 compliant specification sheet. Users can customize the specification sheet format according to their needs. The specification sheet 22 can be exported as a Comma Separated Variable (CSV) file for user requirements or archived electronically for user documentation requirements. Additionally a specified process device index can be created showing summary information on each specified process device. Once specification is complete, the import status of the Tag is removed allowing the Tag to be exported as required for ordering the specified process device.

Order Instructions. The device ordered sequence of instructions 24 places the specified process device definition 22 into an ordered database 26 and can send the ordered database 26 to a process device manufacturer 28 (shown in FIG. 1) to initiate building of the specified process devices. In another aspect of the specification sheets are provided to manufacturer 28. The device ordered sequence of instructions 24 serve as a means for ordering a specified process device from a process device manufacturer 28 using an ordered database 26 that contains a description of the specified process device.

The first computer, such as design computer 10, can place an order-to the second computer 12 at the process device manufacturer 28. Once the order is assembled by the first computer 10 an ordered database 24 can be created. The ordered database 24 can also be created by the second computer 12 upon receiving the order. The order can be transmitted from the first computer 10 to the second computer 12 using any appropriate form of Electronic Data Interchange (EDI) or a machine readable format such as a diskette. A customer can change the order after the order has been sent to the process device manufacturer 28. Since changing the order is an electronic update of existing process device specifications, the change order can be prepared, sent, and implemented rapidly thus reducing the number of changes received after the manufacturing process has begun and saving significant money and time. If the order is changed prior to beginning manufacturing of the process device, the change order can be implemented. If the order is changed after the beginning of manufacturing of the process device, the change order is entered into the order database, but the process device will likely be built according to the original order. The software can save the ordered database as a comma separated value file (CSV). The CSV can be formatted to be compatible with the import requirements of the commissioning software such as AMS or Cornerstone.

Evaluation Instructions. After the process devices are manufactured, the device evaluation sequence of instructions 30 evaluates the built process devices to obtain built process device data 32. Note that the built database can be generated by the process device manufacturing when the device is calibrated (or information is written to its memory or it can be generated prior to shipment by using other software. Each process device is calibrated by the process device manufacturer 28 according to the specification. This calibration process involves downloading specification information to the process device's memory. The specification information is downloaded using a Device Description Language (DDL) that is compliant with process device communication protocols such as HART® and Foundation Fieldbus. The manufacturing calibration software will save the information sent to each built process device, so this information can be organized into a built database. The built database can take the form of an electronic file stored in a computer readable media or a printout. The built database can be communicated by EDI or physical delivery of computer readable media. Usually a copy of the built database is shipped with the built process device to the process plant 34 (shown in FIG. 1). Due to the complexity of process devices it is not uncommon for the built process device to have a built specification that is different from the ordered specification. Additionally, the customer may re-specify a process device's requirements after the order has been placed.

Management Instructions. In order to manage the built process devices, the device management sequence of instructions 36 places the built process device data 32 into a built database 38 contained in a computer readable medium. The built database 38 is compliant with a process device communication protocols such as HART® and Foundation Fieldbus to facilitate communication with process devices and the process plant computer 14. The built database 32 can be used for a variety of management purposes including the purpose discussed below under device comparison sequence of instructions 40 and device maintenance sequence of instructions 46.

Figure 3:
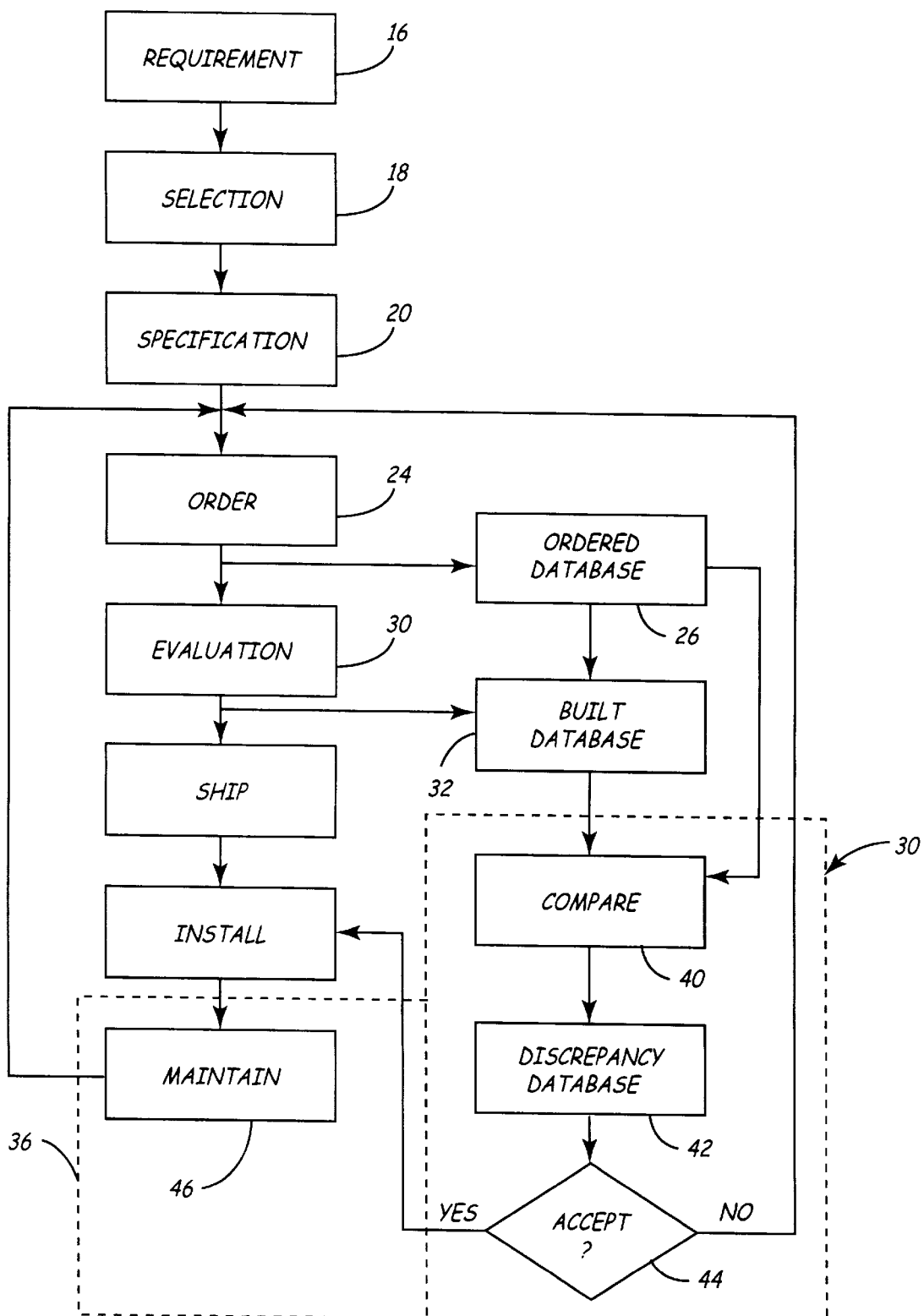
FIG. 3 is a more detailed flowchart of an embodiment of the industrial process device management software in accordance with the invention.
Figure 4:
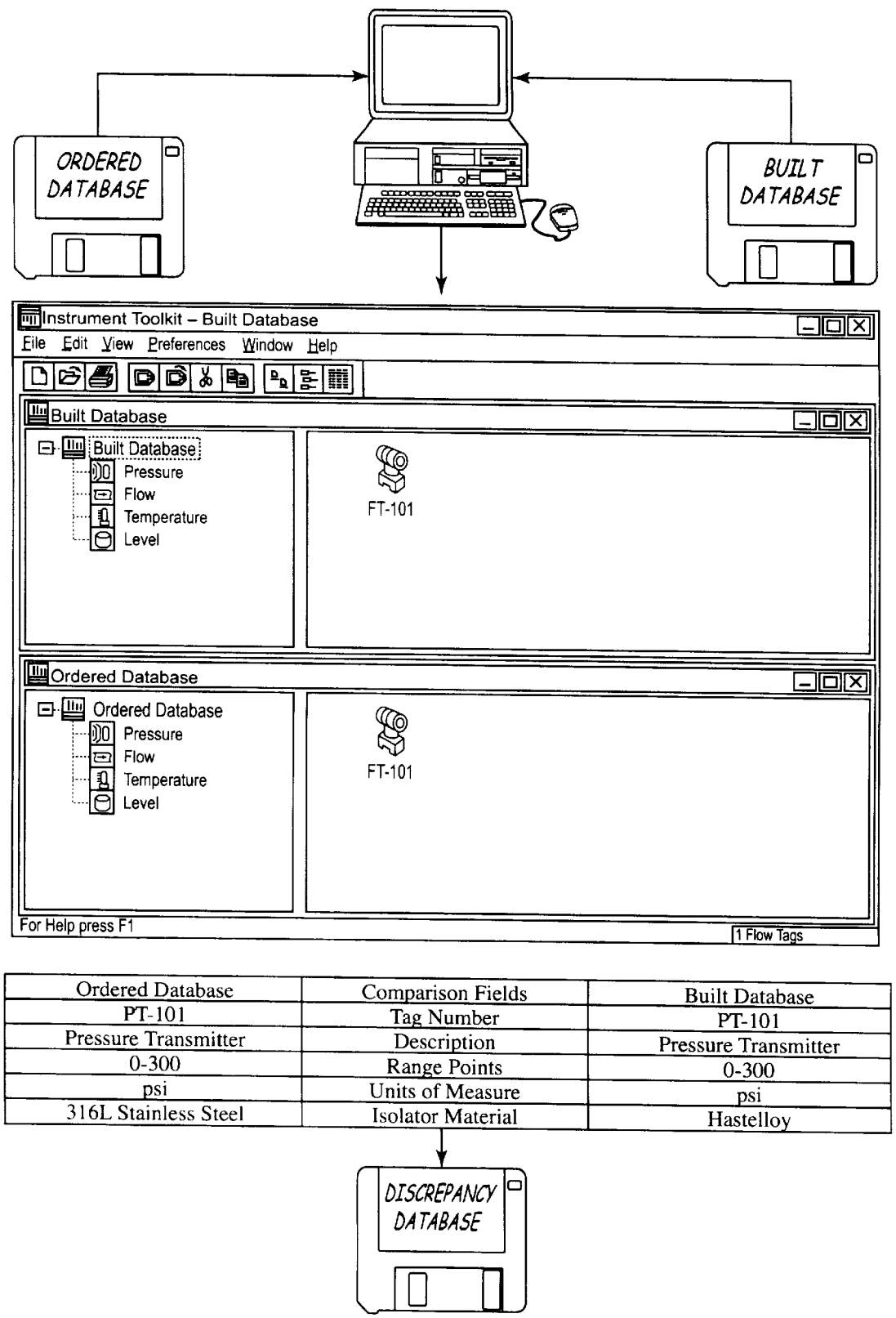
FIG. 4 is a diagram of an embodiment of the device comparing sequence of instructions in accordance with the invention.

FIG. 3 and FIG. 4 are now referenced to illustrate embodiments of the invention that implement the device management sequence of instructions using a device comparison sequence of instructions. Once process devices are delivered to the process plant 34, the process devices are inspected for conformance to specification requirements before installation.

Comparison Instructions. The device comparison sequence of instructions 40 is a component of the evaluation sequence of instructions 30. Instructions 40 compare the ordered database 26 stored in memory with the built database stored in memory to create a discrepancy database that is used to compute whether the built process device meets process requirements. The device comparison sequence of instructions 40 functions as a means for determining whether the built process device meets process requirements.

The device comparison sequence of instructions 40 places the built process device data into a built database 32 and compares the ordered database 26 with the built database 32 to create a discrepancy database 42 that is used to determine whether the built process device meets process requirements. The ordered database 26 and built databases 32 can be Comma Separated Value (CSV) files. The database comparisons can be performed by the second computer 12 using standard database programs that are Structured Query Language (SQL) compliant. Since both the ordered database 26 and built database 32 are built according to the import requirements of the process device installation software such as Asset Management Solutions (AMS) Field Manager, an electronic comparison of the databases can be performed by the third computer 14 at the process plant 34. The knowledge about the ordered database 26 is stored in an import header file. The import header file specifies how the records and fields in the ordered database file 26 are mapped to the database schema.

The process plant 34 will have process device management software such as AMS Field Manager that communicates directly with the process device using a protocol such as HART® or Foundation Fieldbus to configure process devices, and maintain a plant database of process devices. The process device management software will import the ordered database file 26 and allow the user to view and manipulate the ordered process devices in a separate directory or window. The process device management software will also import the built database file 32 and allow the user to view and manipulate the built process devices in a separate directory or window. At block 44, the user will instruct the software to perform the comparison on a process device using menu driven commands or drag and drop between the ordered and built windows. Multiple process device can be compared using a batch process. Discrepancies between the ordered and built process devices are displayed in a standard windows dialogue box or report such as shown in the abbreviated table below.

TABLE

| Ordered Database | Comparison Fields | Shipped Database |
|---|---|---|
| PT-101 | Tag Number | PT-101 |
| Pressure Transmitter | Description | Pressure Transmitter |
| 0–300 psi | Range Points Units of Measure | 0–300 psi |
| 316L Stainless Steel | Isolator Material | Hastelloy |

If the discrepancy is considered by the process plant to be unacceptable, the process plant would reorder the process device. In addition to comparing the ordered and built databases 26, 32 a comparison can also be made between received process devices and the ordered and built databases 26, 32 to determine if a shipping error has occurred.

Figure 5:
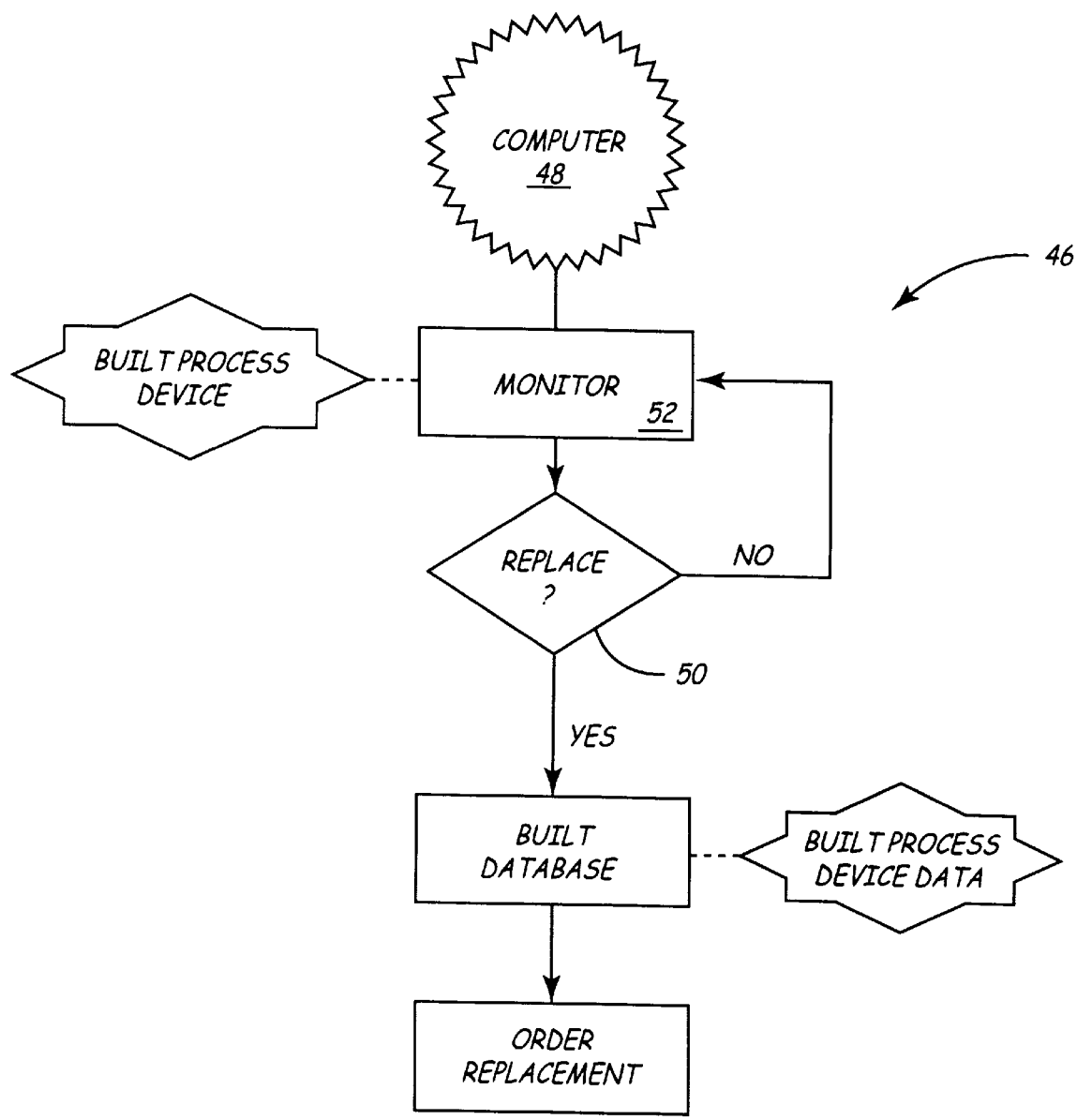
FIG. 5 is a flowchart of an embodiment of the device maintenance sequence of instructions in accordance with the invention.

FIGS. 3 and 5 are now referenced to illustrate an embodiment of the invention that implements the device management sequence of instructions 36 with a device maintenance sequence of instructions 46.

Maintenance Instructions. The software's device maintenance sequence of instructions 46 receives a request for a replacement built process device from a process plant computer 48, recalls the built process device data 50 from the built database 32 and orders a replacement built process device from the process device manufacturer 34. The maintenance sequence of instructions 46 serves as a means to order a replacement built process device without the need to reenter process device data for the replacement built process device.

The request for the replacement built process device occurs at block 50 when it is determined that the built process device being monitored in block 52 has a maintenance condition and should be replaced. The built process device can be monitored manually or with the process plant computer 14 using a program such as a process device asset management program. The software containing the built process device database 32 can be accessed either manually or by the process plant computer 14. The software then recalls the built process device data 50 from the built database 32. If the process device requirements have changed since the process device was built, the user can access the software to update the process device specification and then order a replacement process device without entering new data other than the process device requirement changes. The device maintenance sequence of instructions 46 saves significant time over initiating a new process device order and reduces the likelihood of error by using existing validated process device specifications.

OPERATION EXAMPLE

FIGS. 1–5 are now referenced in the following scenario to describe an illustrative example of an aspect of the invention. There are additional aspects of the invention and more examples that are not discussed, so this example should imply any limitation of the invention.

The identification of process device requirements often begins with a process plant design engineer evaluating design documents containing process requirements such as process data sheets and piping and instrument diagrams. The design engineer can import the process requirements into the software to save time and reduce data entry errors.

Once the process requirements are imported into the software, the design engineer can begin technology selection and specification. During technology selection, the design engineer can evaluate a variety of technologies to determine the desired technology given the process requirements and project management goals. For example the design engineer can evaluate different flow measurement device technologies such as differential pressure, vortex, magnetic, and coriolis against these application requirements to see which of the different flow technologies is optimal. The design engineer selects the desired technology and then executes the sizing calculations such as primary element sizing. After the sizing is completed the software will select a model number. During the technology selection, sizing, and model selection the software will provide a variety of recommendations such as selecting a different product or configuration to meet the process requirements and validation checks such a pressure and temperature limits to assist the design engineer in meeting process requirements.

Once the design engineer is satisfied with the selection and sizing for the process device, the software will then automatically create a specification sheet with all process data, performance, and model number data for the process device. The automatic generation of the specification sheet saves a great deal of time over manual generation of the specification sheet and reduces errors. Once the specification sheets are generated, the process device specifications can be transmitted electronically to a process device manufacturer along with other commercial order related information. The design engineer may then request a quotation or order the process devices from the process device manufacturer. Once the order is finalized an ordered database can be prepared. The design engineer can also export the specification data as a Comma Separated Variable (CSV) file for use with an existing process plant database.

Once the process device manufacturer receives the order, the process devices ordered are built and the built database is generated. The built process devices are then shipped to the process plant. The built database can be shipped in a computer readable form with the built process devices for installation into the third computer such as computer 14 running process device asset management software or electronically transferred directly to the third computer 14 running process device asset management software. The design engineer loads the ordered database along with updates to the ordered database of changes to process device specification that have occurred since the ordered database was sent to the process device manufacturer. The design engineer initiates the process device management software to perform a comparison between the ordered database and the built database to determine the discrepancies. Without this electronic comparison to determine the discrepancies, the manual process is time consuming and error prone. The design engineer evaluates the discrepancies to determine which are acceptable and which require corrective action such as the ordering of a replacement process device. Those process devices that are acceptable are installed in the process plant. Once the process devices are installed, the process devices are commissioned and monitored for operation and maintenance by process device asset management software. Once a condition requiring maintenance of a process device is identified by the process device asset management software, the design engineer can request the software to recall the process device specification and order a replacement process device without the need to reenter process device data.

Although the present invention has been described with reference to preferred embodiments, workers skilled in the art will recognize that changes may be made in form and detail without departing from the spirit and scope of the invention. The description includes specific examples of one implementation (or "species") of the invention such as database formats, fields, and contacts. However, the invention is not limited to this particular "species" and includes the "genus" thereof. Similarly, terms such as device requirement, device selection, device order, device evaluation, and device management sequence of instructions are intended to describe the genus, and not be limited to the particular species set forth herein. Those skilled in the art will recognize that the invention may be implemented for any instrument having any set of specifications or requirements and using any database format or other implementation.

What is claimed is:

1. An industrial process device management computer system, comprising:
    a computer having; a processor, an input coupled to the processor, an output coupled to the processor, memory coupled to the processor and adapted to store predetermined process device data describing physical characteristics of industrial process devices comprising a transmitter or a controller for use in an industrial process, and storing the following sequences of instructions:
    a device requirement sequence of instructions adapted to receive process requirements though the input to define the operating requirements for a process device;
    a device selection sequence of instructions adapted to evaluate the process requirements against the predetermined process device data and to create a specified process device definition meeting process requirements;
    a device order sequence of instructions adapted to place the specified process device definition into an ordered database that is stored in the memory and sendable through the output to a process device manufacturer to initiate building of the specified process device;
    a device evaluation sequence of instructions adapted to receive built process device data through the input to obtain built process device data representing performance characteristics of a built process device; and
    a device management sequence of instructions that uses the built process device data to create a built database that is stored in the memory and accessed by the computer to make decisions regarding the built process device.

2. The industrial process device management computer system as in claim 1, wherein during the device selection, device order, device evaluation and device management sequences of instructions no substantial reentry of data through the input is required.

3. The industrial process device management computer system as in claim 1, wherein the built database is compatible with a process device communication protocol.

4. The industrial process device management computer system as in claim 1, wherein the device evaluation sequence of instructions further comprises:
    a device comparison sequence of instructions adapted to compare the ordered database stored in the memory with the built database stored in the memory to create a discrepancy database that is used to determine whether the built process device meets process requirements.

5. The industrial process device management computer system as in claim 1, wherein the device management sequence of instructions further comprises:
    a device maintenance sequence of instructions adapted to receive a request for a replacement built process device through the input, recalls the built process device data from the built database stored in the memory and orders a replacement built process device through the output from the process device manufacturer.

6. The industrial process device management computer system as in claim 5, wherein device maintenance sequence of instructions recalls the built process device data and orders the replacement process device from the process device manufacturer without the need to reenter built process device data.

7. An industrial process device management computer system, comprising:
    a computer having; a processor, an input coupled to the processor, an output coupled to the processor, memory coupled to the processor and adapted to store predetermined process device data describing physical characteristics of industrial process devices comprising a transmitter or controller for use in an industrial process, and storing the following sequences of instructions:

a device requirement sequence of instructions adapted to receive process requirements though the input to define the operating requirements for a process device;

a device selection sequence of instructions adapted to evaluate the process requirements against the predetermined process device data to create a specified process device definition meeting the process requirements;

a device order sequence of instructions adapted to place the specified process device definition into an ordered database that is stored in the memory and sendable through the output to a process device manufacturer to initiate building of the specified process device;

a device evaluation sequence of instructions adapted to receive built process device data through the input to obtain built process device data representing performance characteristics of a built process device; and a means for managing the built process device with the computer by making decisions regarding the built process device using a built database created from built process device data.

8. The industrial process device management computer system as in claim 7, wherein during the device selection, device order, device evaluation and device management sequences of instructions reentry of data through the input substantially is not required.

9. The industrial process device management computer system as in claim 7, wherein the built database is compatible with a process device communication protocol.

10. The industrial process device management computer system as in claim 7, wherein the device management sequence of instructions, further comprises:

a means for determining whether the built process device meets the process requirements.

11. The industrial process device management computer system as in claim 7, wherein the device management sequence of instructions, further comprises:

a means for ordering a replacement process device without reentering process device data.

12. A method of industrial process device management, comprising:

providing a computer having; a processor, an input coupled to the processor, an output coupled to the processor, memory coupled to the processor and adapted to store predetermined process device data describing physical characteristics of industrial process devices comprising a transmitter or controller for use in an industrial process, and storing the following sequences of instructions:

receiving process requirements though the input to define the operating requirements for a process device;

selecting a process device by evaluating the process requirements against predetermined process device data to create a specified process device definition meeting process requirements;

ordering a process device by placing the specified process device definition into an ordered database that is stored in the memory and sent through the output to a process device manufacturer to initiate building of the specified process device;

obtaining built process device data through the input to obtain built process device data representing performance characteristics of a built process device; and managing the built process device by using the built process device data to create a built database that is stored in the memory and accessed by the computer to make decisions regarding the built process device.

13. The method of industrial process device management as in claim 12, wherein managing the built process device, further comprises:

comparing the ordered database stored in the memory with the built database stored in the memory to create a discrepancy database that is used to determine whether the built process device meets process requirements.

14. The method of industrial process device management as in claim 12, wherein managing the built process device, further comprises:

maintaining the built process device by receiving a request for a replacement built process device, recalling the built process device data from the built database, and ordering a replacement built process from the process device manufacturer.

15. An industrial process device integration software product on a medium readable by a processor, the medium storing a plurality of sequences of instructions, comprising:

a device requirement sequence of instructions adapted to receive process requirements to define operating requirements for a process device comprising a transmitter or a controller for use in an industrial process;

a device selection sequence of instructions adapted to evaluate the process requirements against predetermined process device data to create a specified process device definition meeting the process requirements;

a device order sequence of instructions adapted to place the specified process device definition into an ordered database that is sendable to a process device manufacturer to initiate building of the specified process device;

a device evaluation sequence of instructions adapted to receive built process device data to obtain built process device data representing performance characteristics of a built process device; and a device management sequence of instructions adapted to use the built process device data to create a built database stored on the medium that is used to make decisions regarding the built process device.

16. The industrial process device integration software product as in claim 15, wherein the device management sequence of instructions comprises:

a device comparing sequence of instructions adapted to compare the ordered database with the built database to create a discrepancy database that is used to determine whether the built process device meets the process requirements.

17. The industrial process device integration software product as in claim 15, wherein the device management sequence of instructions comprises:

a device maintenance sequence of instructions adapted to receive a request for a replacement built process device, recalls the built process device data from the built database and orders a replacement built process device from the process device manufacturer.

* * * * *